US012418114B2

(12) United States Patent
Matitsine et al.

(10) Patent No.: US 12,418,114 B2
(45) **Date of Patent: *Sep. 16, 2025**

(54) 360° COMMUNICATIONS LENSES AND SYSTEMS

(71) Applicant: Matsing, Inc., Irvine, CA (US)

(72) Inventors: Serguei Matitsine, Dallas, TX (US); Leonid Matytsine, Irvine, CA (US); Anthony DeMarco, Leadville, CO (US)

(73) Assignee: Matsing, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,043

(22) Filed: May 3, 2022

(65) Prior Publication Data

US 2022/0263247 A1 Aug. 18, 2022

Related U.S. Application Data

(63) Continuation of application No. 16/253,174, filed on Jan. 21, 2019, now Pat. No. 11,336,023.

(60) Provisional application No. 62/619,662, filed on Jan. 19, 2018.

(51) Int. Cl.
*H01Q 15/02* (2006.01)
*H01Q 3/08* (2006.01)

(52) U.S. Cl.
CPC ............... *H01Q 15/02* (2013.01); *H01Q 3/08* (2013.01)

(58) Field of Classification Search
CPC ........... H01Q 3/08; H01Q 15/02; H01Q 19/06
See application file for complete search history.

(56) References Cited

U.S. PATENT DOCUMENTS

| | | | |
|---|---|---|---|
| 9,666,943 B2 | 5/2017 | Matitsine et al. | |
| 9,728,860 B2 | 8/2017 | Matitsine et al. | |
| 9,819,094 B2 | 11/2017 | Matitsine et al. | |
| 2005/0068251 A1 | 3/2005 | Ebling et al. | |
| 2006/0017637 A1 | 1/2006 | Howell et al. | |
| 2007/0296640 A1 | 12/2007 | Colburn et al. | |
| 2014/0139370 A1 | 5/2014 | Hamner et al. | |
| 2015/0325348 A1 | 11/2015 | Matitsine | |
| 2017/0040705 A1 | 2/2017 | Matitsine et al. | |
| 2017/0062944 A1* | 3/2017 | Zimmerman | H01Q 15/08 |
| 2017/0324171 A1* | 11/2017 | Shehan | H01Q 5/30 |
| 2019/0058251 A1 | 2/2019 | Kawahata | |
| 2019/0207303 A1 | 7/2019 | Porter et al. | |
| 2020/0059004 A1* | 2/2020 | Zimmerman | H01Q 19/062 |

FOREIGN PATENT DOCUMENTS

WO 2010016799 A1 2/2010

* cited by examiner

*Primary Examiner* — Raymond R Chai
(74) *Attorney, Agent, or Firm* — Fish IP Law, LLP

(57) ABSTRACT

An antenna has multiple RF elements disposed about a lens in at least two tracks. The at least two tracks collectively subtend more than 360° about the lens, providing highly customizable, adaptable, and steerable wireless communication. An array of multiple lenses and tracks is also contemplated.

8 Claims, 2 Drawing Sheets

360° COMMUNICATIONS LENSES AND SYSTEMS

This application is continuation of U.S. application Ser. No. 16/253,174, filed Jan. 21, 2019, which claims the benefit of U.S. provisional application No. 62/619,662, filed Jan. 19, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is wireless communication.

BACKGROUND

As wireless communication devices continue to proliferate, and the volume of data transmitted by each device continues to increase, wireless communication providers continue to develop improved systems and devices to efficiently provide wireless communication services to an increasingly demanding user base.

Some providers have attempted to improve wireless communication networks by increasing the number of antenna locations in the network. However, merely increasing the number of antenna locations is problematic, both from a cost standpoint and from an NIMBY standpoint.

It is also known to deploy multiple antenna arrays at a given location. This solution is expensive, because of the many antennas involved, and signal interference among the different arrays.

Matsing, Inc. has pioneered the use of lens antennas, on which can be deployed multiple RF elements (radio frequency radios). US Publication no. 2015/0325348 to Matitsine teaches practical manufacture of light weight lens antennas using random distribution of large numbers of basic units comprising an active material. U.S. Pat. No. 9,819,094 to Matitsine teaches use of multiple radios (RF elements) about a given lens antenna. U.S. Pat. No. 9,666,943 to Matitsine and US Publication no. 20170040705 to Matitsine each teach arrays of multiple lens, each having multiple RF elements. U.S. Pat. No. 9,728,860 to Matitsine teaches use of electronic and mechanical phase shifting to steer beams from multiple RF elements.

These and all other publications referenced herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

International Publication No. WO 2010/016799 to Matitsine teaches use of lens antennas to provide 360° of wireless communication coverage with a single lens. A problem still arising arises, however, that multiple RF elements disposed in a single track about a lens tend to interfere with one another if operated simultaneously.

Thus, there is still a need for systems and devices that provide customizable, adaptable, and steerable wireless communication in both 360° degrees around an antenna and directed at angles substantially above and substantially below the antenna.

SUMMARY OF THE INVENTION

Figure 1:
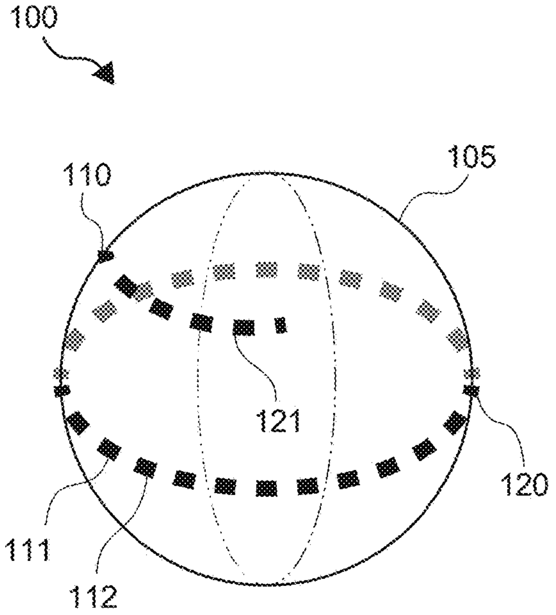
FIG. 1 is a schematic of an antenna having a spherical lens about which are disposed a first equatorial track of RF elements, and a second track of RF elements in an upper hemisphere.

The inventive subject matter provides apparatus and systems in which communication antennas having a first set of RF elements disposed in a first track about a lens, and a second set of RF elements disposed in a second track about the lens. The first track and the second track collectively subtend more than 360° about the lens, and the various RF elements in a given tracks are preferably, but not necessarily, moveable (i.e., translatable) along the track. By positioning the first and second (or other) tracks in different latitudes or longitudes about a lens, beams of RF elements disposed in the first track will tend to have much reduced interference with beams of RF elements in the second or other tracks.

The following description includes information that may be useful in understanding the present invention. It is not an admission that any of the information provided herein is prior art or relevant to the presently claimed invention, or that any publication specifically or implicitly referenced is prior art.

Lenses contemplated herein could be a Luneburg or other spherical gradient index lens, but because of weight and other practical considerations, lenses are more preferably those utilizing a random distribution of large numbers of basic units comprising an active material. Although spherical lenses are preferred, lenses of other shapes (e.g., cylindrical, oblong, spheroid, ellipsoid, ovoid, etc or even asymmetrical) are also contemplated. In some embodiments, the longest chord of the lens shape is at least 5% greater than the shortest chord, but can also be at least 10%, 15%, or 20% greater.

At least some, and preferably most or all of the RF elements are moveable (i.e., translatable) within their respective tracks. In some embodiments it is even contemplated that RF elements can move between or among tracks. In addition to moving along a track, i.e. translating from one to another position along a track, it is also contemplated that any of the RF elements can be steerable without translating along its track. In some embodiments, some (preferably most or all) RF elements in the first track are moveable, steerable, or some partial or whole combination thereof.

The tracks along which RF elements can be moved can have any suitable lengths and/or shapes. For example, tracks can be linear, sinusoidal, or circular. Tracks can also be positioned parallel or angled to one another, and can touch or not touch other tracks. It is contemplated that a single lens can have RF elements disposed along third, fourth, or more tracks. Preferably the combination of at least two tracks subtends more than 360° about the lens.

Various objects, features, aspects and advantages of the inventive subject matter will become more apparent from the following detailed description of preferred embodiments, along with the accompanying drawing figures in which like numerals represent like components.

DETAILED DESCRIPTION

FIGS. 1-6 depict various antennas of the inventive subject matter.

FIG. 1 illustrates a front view of antenna 100, generally comprising a spherical lens 105 about which are disposed two tracks 120 and 110 of RF elements. In preferred embodiments, the lenses of the inventive subject matter comprise dielectric materials as described in U.S. Pat. No. 8,518,537 to Matitsine. Longer track 120 is positioned equatorially, and shorter track 110 is positioned parallel to track 120, but in an upper hemisphere. Longer track subtends 360° while the shorter track 110 subtends only about 45°. Thus, a combination of the two tracks 120, 110 subtends more than 360° about the lens.

Track 120 includes RF elements 111 and 112, and track 110 includes RF element 121. Each of RF elements 111, 112, 121 are configured to emit and/or receive RF signals through the lens. The RF elements are preferably positioned in different latitudes, and the signals are preferably utilized in-phase, to avoid interference. RF elements 111 and 112 are configured to receive the same signal feed.

Figure 2:
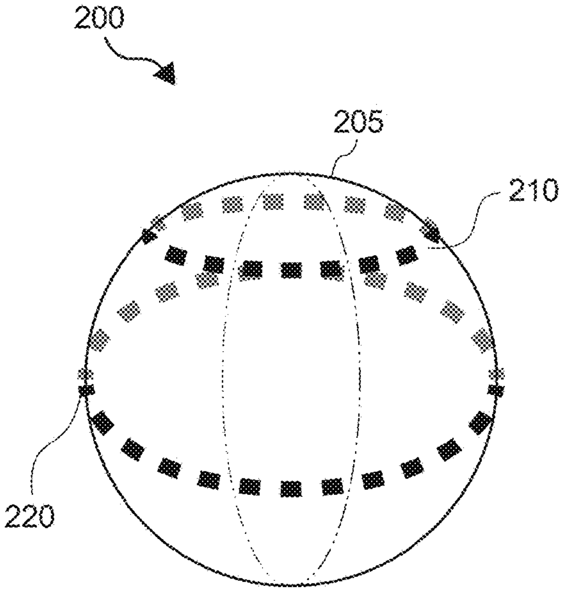
FIG. 2 is a schematic of an alternative antenna having a spherical lens about which are disposed a first equatorial track of RF elements, and a longer second track of RF elements in an upper hemisphere.

FIG. 2 illustrates a schematic of antenna 200. Antenna 200 is shown to include two tracks 210 and 220 disposed about lens 205, where track 220 is positioned equatorially, and track 210 is positioned along the upper hemisphere. Antenna 200 differs from antenna 100 because track 220 subtends 360° of the upper hemisphere.

Figure 3:
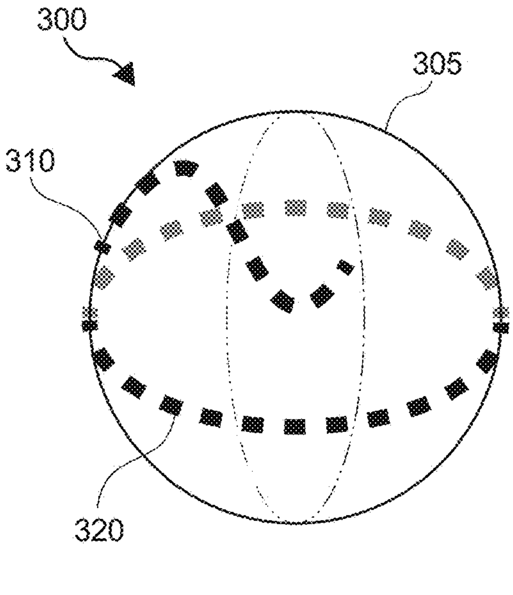
FIG. 3 is a schematic of an alternative antenna having a spherical lens about which are disposed a first equatorial track of RF elements, and a sigmoidal second track of RF elements in an upper hemisphere.

FIG. 3 illustrates a schematic of antenna 300, having two tracks 310 and 320 disposed about lens 305, where track 320 is again equatorial, and track 310 is sinusoidal. Sinusoidal track 310 subtends about 120° of the sphere, such that a combination of tracks 310, 320 subtends about 480°.

Figure 4:
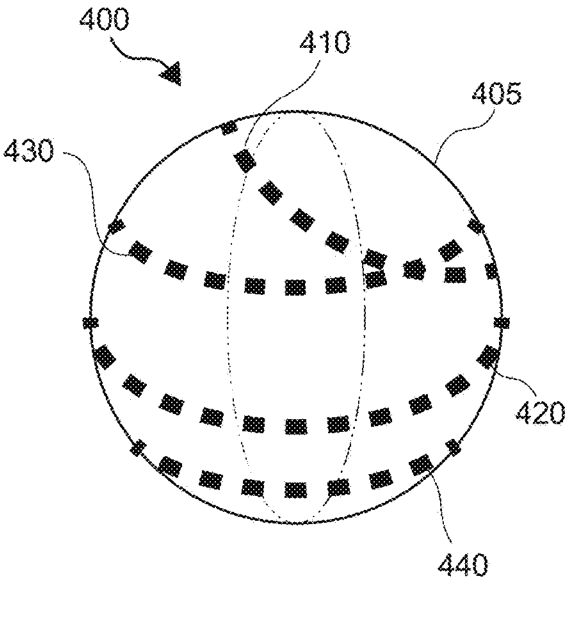
FIG. 4 is a schematic of an alternative antenna having a spherical lens about which are disposed four tracks of RF elements, two of which intersect or overlap.

FIG. 4 illustrates a schematic of antenna 400 having four tracks 410, 420, 430, and 440 disposed about lens 405. Track 420 is equatorial, but subtends only about 180°. Tracks 410 and 430 are in the upper hemisphere, and track 440 is in the lower hemisphere. Track 410 intersects or overlaps track 430.

Figure 5:
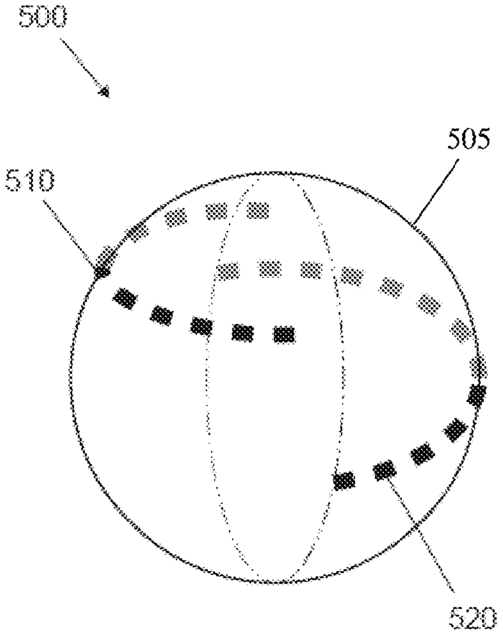
FIG. 5 is a schematic of an alternative antenna having a spherical lens about which are disposed two tracks of RF elements disposed in different hemispheres, directing RF beams in different directions.

FIG. 5 illustrates a schematic of antenna 500. The antenna 500 is shown to include two tracks 510 and 520, each subtending only about 180°. Tracks 510, 520 are positioned at different latitudes with respect to the lens 505, with track 510 is in the upper hemisphere, and track 520 is in the lower hemisphere. The vertical offset of track 510 from track 520 allows for RF elements on both tracks to output signals simultaneously in opposite directions from each other, using the same lens 505, but with greatly reduced from RF elements on the other track. A combination of the two tracks subtends at least 360° about the lens, providing at least 360° of signal coverage.

Figure 6:
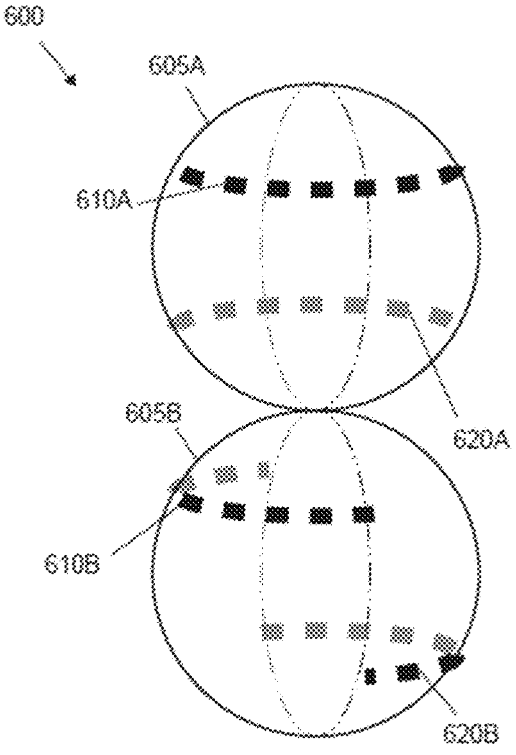
FIG. 6 is a schematic of an array of an antenna having first and second lenses, where each lens has tracks of RF elements disposed in different hemispheres, directing RF beams in different directions.

FIG. 6 illustrates schematic of antenna array 600 which comprises multiple lenses 605A, 605B, with multiple tracks 610A, 620A arranged about lens 605A that collectively subtend at least 360°, and multiple tracks 610B, 620B arranged about lens 605B that collectively subtend at least 360°

The discussion herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of components, properties such as orientation, location, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An antenna array comprising:

a first track disposed about a first lens;

each of a first RF element and a second RF element translatable along the first track;

a second track disposed about a second lens;

each of a third RF element and a fourth RF element translatable along the second track; and wherein at least the first RF element is moveable relative to the second RF element, and is steerable; wherein the first RF element is configured to emit a first signal, the second RF element is configured to emit a second signal, the third RF element is configured to emit a third signal, and the fourth RF element is configured to emit a fourth signal.

2. The antenna array of claim 1, wherein the first track is parallel to the second track.

3. The antenna array of claim 1, wherein at least the first signal and the second signal are in-phase.

4. The antenna array of claim 1, wherein the first track subtends 180° about the first lens.

5. The antenna array of claim 1, wherein at least the first RF element is steerable via phase shifting.

6. The antenna array of claim 1, wherein the first and second RF elements share a signal feed.

7. The antenna array of claim 1, wherein the first and second tracks are disposed within different hemispheres.

8. The antenna array of claim 1 wherein the first and second lens are adjacent.

* * * * *